(12) United States Patent
Okamoto

(10) Patent No.: US 11,281,081 B2
(45) Date of Patent: Mar. 22, 2022

(54) PROJECTOR AND A METHOD OF HOLDING THE PROJECTOR

(71) Applicant: NEC Display Solutions, Ltd., Tokyo (JP)

(72) Inventor: Takayuki Okamoto, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 0 days.

(21) Appl. No.: 17/042,064

(22) PCT Filed: Apr. 27, 2018

(86) PCT No.: PCT/JP2018/017277
§ 371 (c)(1),
(2) Date: Sep. 25, 2020

(87) PCT Pub. No.: WO2019/207787
PCT Pub. Date: Oct. 31, 2019

(65) Prior Publication Data
US 2021/0033951 A1 Feb. 4, 2021

(51) Int. Cl.
*G03B 21/14* (2006.01)

(52) U.S. Cl.
CPC .................. *G03B 21/145* (2013.01)

(58) Field of Classification Search
CPC .............................. G03B 21/145; G03B 21/14
USPC ........................................................ 353/119
See application file for complete search history.

(56) References Cited

U.S. PATENT DOCUMENTS

| 9,575,395 B2* | 2/2017 | Unno | H02G 3/30 |
| 2009/0316118 A1* | 12/2009 | Dittmer | F16M 13/02 |
| | | | 353/119 |
| 2014/0077053 A1* | 3/2014 | Chang | G03B 21/54 |
| | | | 248/346.06 |

FOREIGN PATENT DOCUMENTS

| JP | 2007-114408 A | 5/2007 |
| JP | 2011-175131 A | 9/2011 |
| JP | 2012-177757 A | 9/2012 |
| JP | 2013-076734 A | 4/2013 |
| JP | 2013-092585 A | 5/2013 |
| JP | 2013-218048 A | 10/2013 |
| JP | 2015-004780 A | 1/2015 |

OTHER PUBLICATIONS

International Search Report (ISR) (PCT Form PCT/ISA/210), in PCT/JP2018/017277, dated Jul. 10, 2018.

* cited by examiner

*Primary Examiner* — William C. Dowling
(74) *Attorney, Agent, or Firm* — McGinn I.P. Law Group, PLLC.

(57) ABSTRACT

A projector and a method for holding the projector, which can prevent the projector from dropping and which can prevent noise emission. The projector of the present disclosure includes resin housing having multiple mounting portions, hanging metal plate disposed inside housing, at least one metal member disposed inside housing, connected to hanging metal plate, and integrated with hanging metal plate to form a loop shape, grounding member that is connected to the loop shape and grounds hanging metal plate, hanging metal fitting for fixing housing to a wall surface or ceiling, fixing member for fixing hanging metal fitting from the outside of housing to multiple portions, the hanging metal plate being fixed to hanging metal fitting through fixing member in at least one portions.

10 Claims, 11 Drawing Sheets

PROJECTOR AND A METHOD OF HOLDING THE PROJECTOR

TECHNICAL FIELD

The present invention relates to a projector and a method of holding the projector.

BACKGROUND ART

Projectors that project images onto a screen are typically placed approximately in front of the screen, on a floor or a desk, or installed on a ceiling, wall, or the like.

When installing the projector on the ceiling, fix a hanging metal fitting to the ceiling in the state where the hanging metal fitting fixed to the mounting portion of the projector with male screws. Here, when female screws of the mounting portion of the projector are formed by inserting a metal nut into a boss formed in a resin housing, due to damage to the boss based on chemical cracks or aging deterioration, there is a possibility that the projector will fall.

Therefore, Patent Document 1 discloses an example of a projector in which steps to prevent falling are taken.

Projector described in Patent Document 1 includes a resin housing, a metal shield disposed inside the housing, an insert nut that is inserted into the housing and configured to be usable for fixing to a predetermined external member. The insert nut includes a fixing portion which is attached to the metal shield while being inserted into the housing. Then, a ceiling hanging metal fitting for hanging the projector on the ceiling is attached to the insert nut. Thus, the projector is fixed to the ceiling using the ceiling hanging metal fitting. Further, the metal shield inside the housing is a sheet metal member having a relatively large L-shape. Major components of the projector are fixed to the metal shield. As a result, in a state where the projector is suspended on the ceiling or the like, if the resin housing is burned by a fire or if cracks occur in the resin housing due to severe use environment, only the main components by the metal shield can be held in a state of being suspended from the ceiling. In other words, it is possible to prevent the main components of the projector from falling.

LITERATURE OF THE PRIOR ART

Patent Documents

Patent Document 1: JP2015-004780A

SUMMARY OF INVENTION

Problem to be Solved by the Invention

Since the projector described in Patent Document 1 is provided with a metal shield, the metal shield can be an antenna for radiating noise (unnecessary radiation).

Furthermore, if the shape or mounting method of the metal shield is poor, there is a possibility that strong noise will be radiated from the metal shield.

That is, the metal shields used to fix the projector to the ceiling may be responsible for EMIs (Electromagnetic Interference).

In view of the above problems, an object of the present invention is to provide a projector and a holding method of the projector, which can prevent dropping of the projector and noise emission.

Means for Solving the Problem

The projector of the present invention is provided with a resin housing having a plurality of mounting portions; a hanging metal plate that is disposed inside the housing; at least one metal member that is disposed inside the housing and forms a loop shape by connecting to the hanging metal plate; a grounding member that is connected to the loop shape and grounds the hanging metal plate; hanging a metal fitting for fixing the housing to a wall surface or ceiling; a fixing member for fixing the hanging metal fitting from the outside of the housing to the plurality of mounting portions; and the hanging metal plate that is fixed to the hanging metal fitting through the fixing member in at least one of the mounting portions.

A method of holding a projector, the projector that is configured to a resin housing having a plurality of mounting portions; a hanging metal plate that is disposed inside the housing; at least one metal member that is disposed inside the housing and that forms a loop shape by connecting to the hanging metal plate; a grounding member that is connected to the loop shape and grounds the hanging metal plate; a hanging metal fitting; the present method is provided with the steps of: fixing the hanging metal fitting to the plurality of mounting portions; fixing the hanging metal fitting to the hanging metal plate using a fixing member in at least one of the mounting portions: fixing the housing to a wall surface or ceiling.

Effect of the Invention

According to the present invention, it is possible to prevent dropping of the projector, and it is possible to prevent noise emission.

BEST MODE FOR CARRYING OUT THE INVENTION

Hereinafter, embodiments according to the present invention will be described with reference to the accompanying drawings.

First Example Embodiment (Structure)

Figure 1:
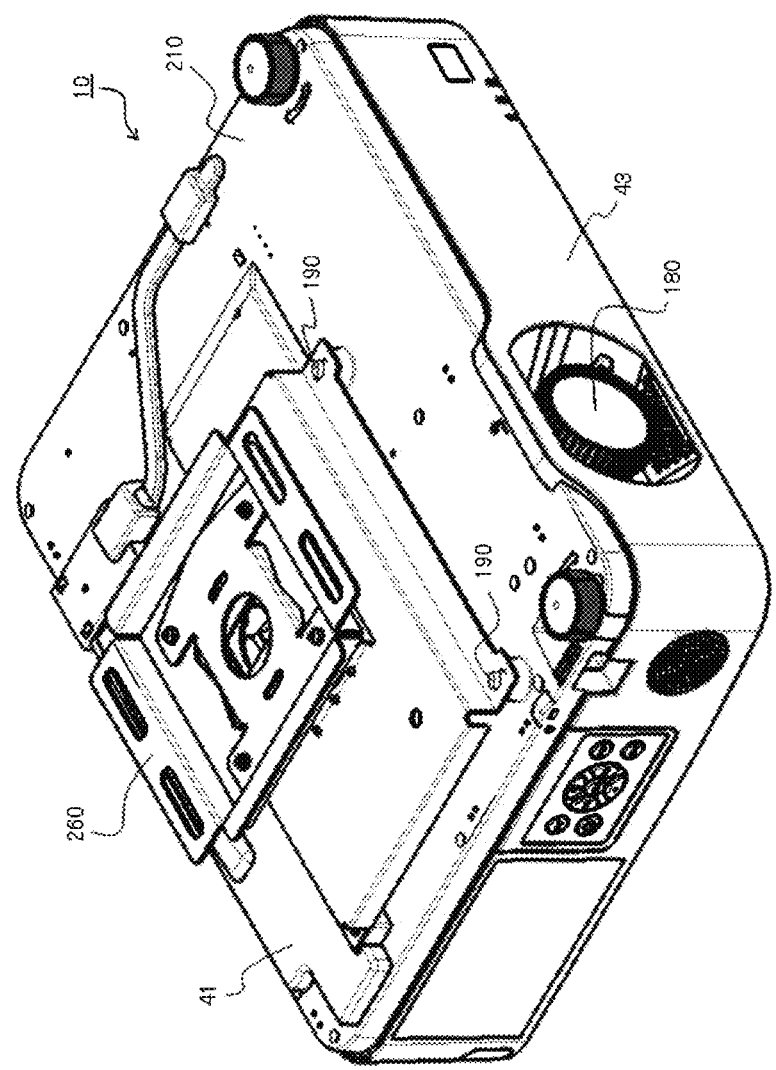
FIG. 1 is an assembled perspective view showing a configuration of a projector according to a first example embodiment of the present invention.
Figure 2:
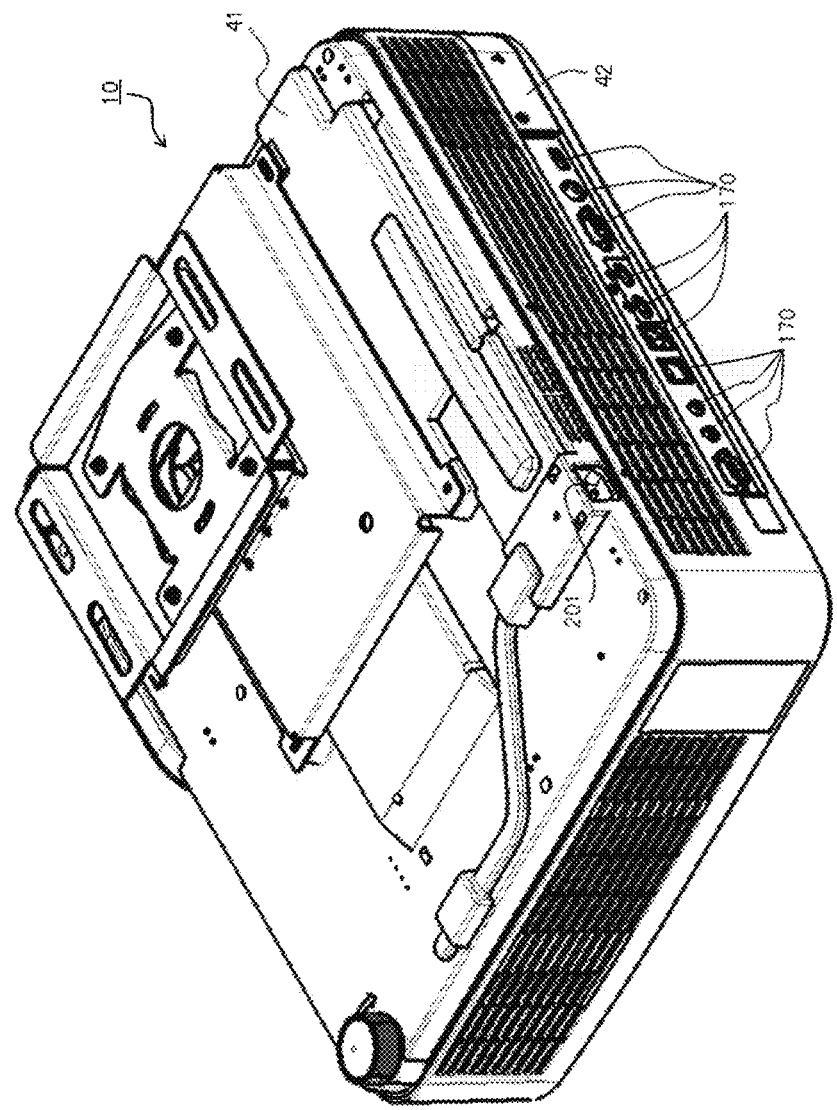
FIG. 2 is a perspective view of the projector shown in FIG. 1 viewed from another angle.
Figure 3:
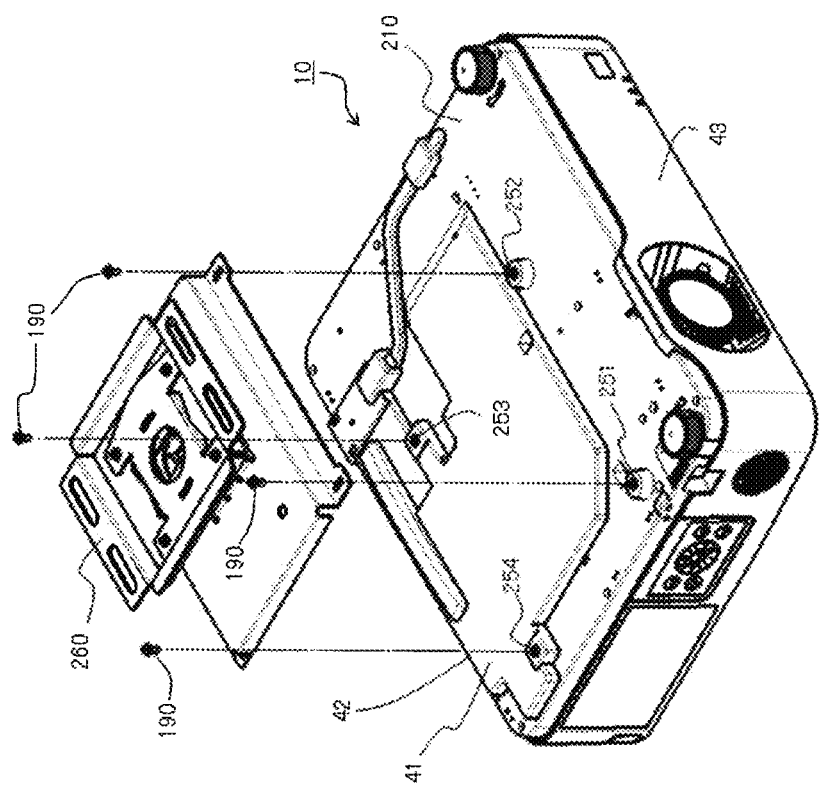
FIG. 3 is an exploded perspective view of removing a hanging metal fitting from the projector shown in FIG. 1.

FIG. 1 is an assembled perspective view showing a configuration of a projector according to a first example embodiment of the present invention. FIG. 2 is a perspective view of the projector shown in FIG. 1 viewed from another angle, and is a view seen from the side on which a terminal port is formed. FIG. 3 is an exploded perspective view of removing a hanging metal fitting from the projector shown in FIG. 1.

Referring to FIG. 1, projector 10 has a box-shaped shape that is flat, substantially rectangular parallelepiped, comprising a housing 210, a hanging metal fitting 260, a plurality of fixing members 190 and a projection lens 180. The projector 10 is fixed to the ceiling or wall using the hanging metal fitting 260 to project an image onto the screen. A projection lens 180 is arranged on a surface (hereinafter, referred to as the front surface 43) that forms the box shape of the projector 10 and faces the screen. On the surface opposite to the front surface 43 (hereinafter referred to as the rear surface 42), the power supply inlet 201 is exposed and a plurality of terminal ports 170 for connecting the input terminals are formed (see FIG. 2). The rear surface 42 can be referred to as the first surface. Adjacent the front surface 43 and the rear surface 42, on the surface which is directed toward the ceiling or wall surface to which the projector 10 is fixed, four mounting portions 251,252,253,254 are formed (see FIG. 3). The surface on which the mounting portion 251,252,253,254 is formed is referred to as the bottom surface 41. The bottom surface 41 is a lower surface in the gravity direction when the projector 10 is placed on the floor or a desk, and can be referred to as the second surface. When hanging the projector 10 from the ceiling, projector 10 is inverted vertically, the bottom surface 41 becomes the gravity direction upper side as shown in FIGS. 1 to 3.

Mounting portions 251,252,253,254 have a female screw. By heat press inserting the insert nut into the through hole provided in resin housing 210 on bottom surface 41, the female screws of mounting portions 251 and 252 located on the side closer to front surface 43 are formed. On the other hand, the configuration of the female screws of mounting portions 253 and 254 will be described later. The mounting portion 253 and mounting portion 254 are approximately equal in distance to rear surface 42 and are located closest to rear surface 42 among four mounting portions 251,252, 253,254. In other words, mounting portion 251 and the mounting portion 252 are farther from the rear surface 42 having the terminal ports 170 than mounting portion 253 and mounting portion 254. The mounting portion 254 is a straight line passing over mounting portion 253 of bottom surface 41 which is located on a straight line substantially parallel to the straight side connecting rear surface 42 and bottom surface 41. Fixing member 190 fixes the hanging metal fitting 260 to each mounting portion 251,252,253,254. In the present embodiment, as an example, the fixing member 190 is a male screw.

The hanging metal fitting 260 has a well-known ceiling or wall surface holding mechanism, which will not be described in detail. Further, the hanging metal fitting 260, as shown in FIG. 3, by removing the fixing member 190, can be removed from the housing 210. The hanging metal fitting 260, when mounted on a ceiling or wall surface, generates a ground plane by contact with the ceiling or wall surface over a sufficient area.

Figure 4:
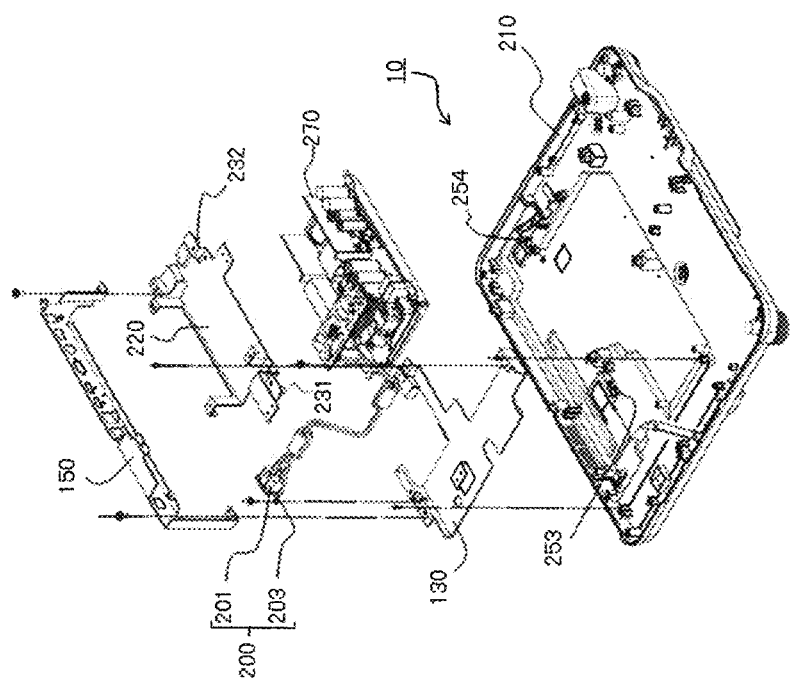
FIG. 4 is an exploded perspective view showing a configuration of a bottom surface inside the projector shown in FIG. 1.
Figure 5:
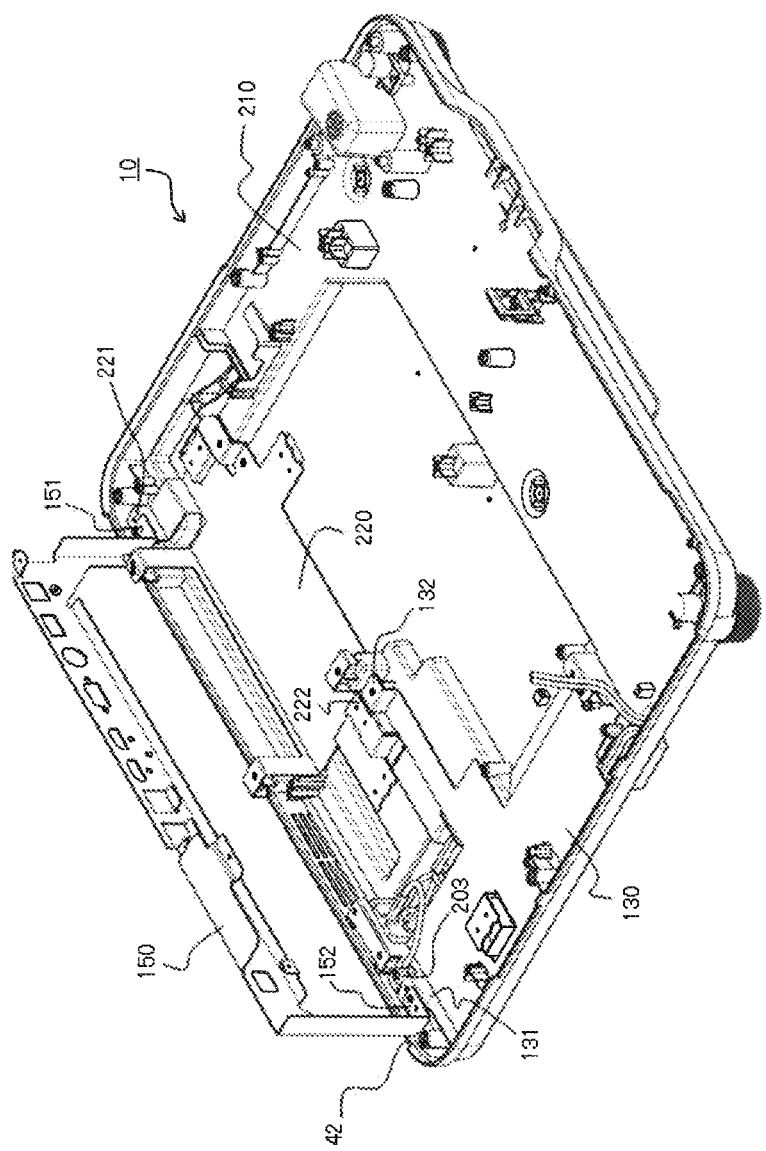
FIG. 5 is a perspective view showing a configuration of assembling each component other than the power supply shown in FIG .4.

Next, with reference to FIGS. 4 and 5, the internal configuration of the projector 10 will be described. FIG. 4 is an exploded perspective view showing a configuration of a portion of bottom surface 41 inside the projector 10. FIG. 5 is a perspective view showing a configuration of assembling each component other than the power supply shown in FIG. 4. Incidentally, in FIGS. 1 to 3, although the projector 10 is shown oriented to be suspended on the ceiling, in FIGS. 4 and 5, the projector 10 is shown in the opposite direction from FIGS. 1 to 3, i.e. placed on the floor. Referring to FIG. 4, the projector 10 further includes hanging metal plate 220, metal plate ground 130, terminal panel 150, power supply 270, and grounding member 200. Grounding member 200 includes power supply inlet 201 and a ground terminal 203.

Hanging metal plate 220, terminal panel 150 and metal plate ground 130 are all conductive sheet metal members. Referring to FIG. 5, hanging metal plate 220, terminal panel 150 and metal plate ground 130 form a loop shape as daisy chain connections. In another view, end portion 221 of hanging metal plate 220 is connected to end portion 151 of terminal panel 150, another end portion 152 of terminal panel 150 is connected to end portion 131 of the metal plate ground 130, another end portion 132 of metal plate ground 130 is connected to another end portion 222 of hanging metal plate 220. Thus, hanging metal plate 220, terminal panel 150 and metal plate ground 130 form an annular conductor which is integral.

So that terminal ports 170 are exposed to the outside of housing 210, connector terminals are attached to terminal panel 150. Terminal panel 150 is located in the vicinity of rear surface 42 of projector 10 to form a surface having a plurality of terminal ports 170 on rear surface 42 of projector 10 (see FIG. 2).

Figure 6:
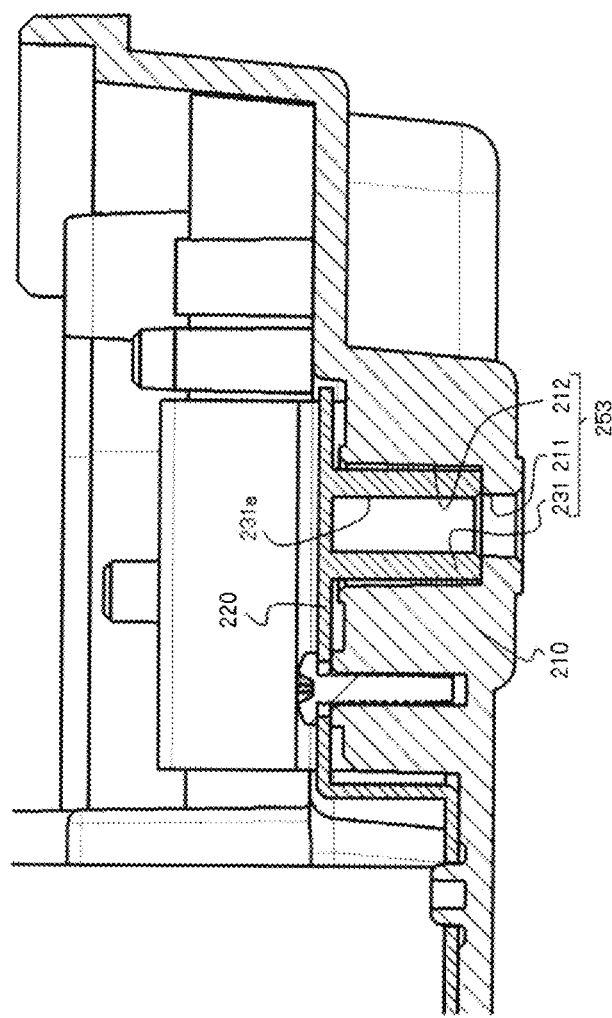
FIG. 6 is a sectional view showing a configuration of a mounting portion of the rear side of the projector shown in FIG. 1.

Hanging metal plate 220 is used for mounting hanging metal fitting 260 which is attached to the outside of housing 210. Hanging metal plate 220 has caulking nut 231 at the position of mounting portion 253 of housing 210, and caulking nut 232 at the position of mounting portion 254 (see FIG. 4). Here, FIG. 6 is a cross-sectional view showing the configuration of mounting portion 253. Referring to FIG. 6, housing 210 is formed with hole 211 and counterbore 212. The above-described caulking nut 231 formed with female screw portion 231a is fitted into counterbore 212. Note that the inner diameter of counterbore 212 and the outer diameter of caulking nut 231 is substantially matched. As a result, a female screw is formed in mounting portion 253. In other words, by having caulking nut 231 fixed to the hanging metal plate 220, hole 211, and counterbore 212, mounting portion 253 forms a female screw. The fixing member 190 described above is screwed to female screw portion 231a (see FIG. 3). Thus, fixing member 190 fixes hanging metal fitting 260 from the outside of housing 210 to hanging metal plate 220 inside housing 210. At this time, hanging metal plate 220, hanging metal fitting 260 and fixing member 190 are configured of a highly conductive material. That is, the hanging metal plate 220 and hanging metal fitting 260 are electrically connected with low resistance. Incidentally, mounting portion 254 also has the same configuration as mounting portion 253. Thus, even in mounting portion 254, hanging metal fitting 260 is fixed to hanging metal plate 220.

Figure 7:
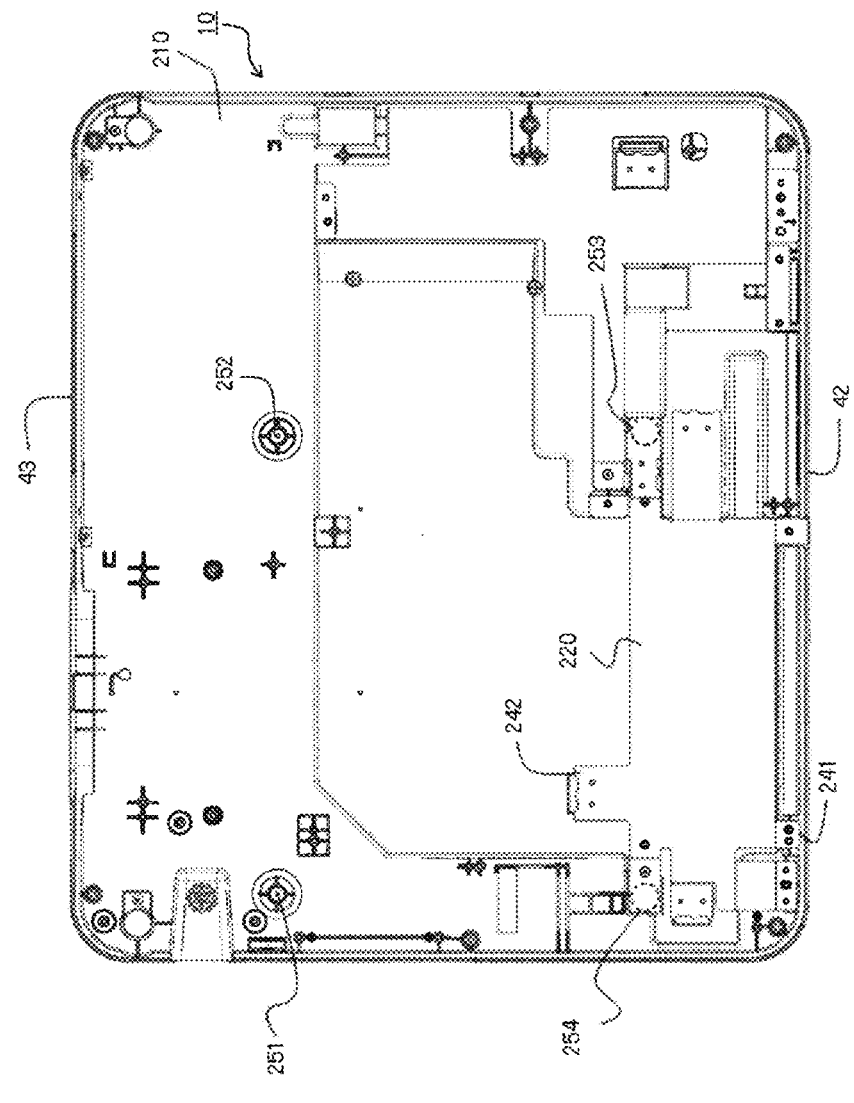
FIG. 7 is a plan view seen from the inside of the housing of the projector shown in FIG. 5.

FIG. 7 is a plan view seen from the inside of housing 210 of the projector 10 shown in FIG. 5. The mounting portion 254 and mounting portion 253 is covered with hanging metal plate 220. That is, hanging metal plate 220 covers the position of mounting portion 253 and mounting portion 254 of housing 210, but does not cover mounting portion 251 and mounting portion 252. Further, in another view, one end 241 of hanging metal plate 220 is located in the vicinity of rear surface 42 than mounting portion 253 and mounting portion 254. On the other hand, the other end 242 of hanging metal plate 220 is located farther from rear surface 42 than mounting portion 253 and mounting portion 254, and is located in the vicinity of rear surface 42 than mounting portion 251 and mounting portion 252. Further, hanging metal plate 220 can be attached with any component (not shown) disposed inside housing 210. In particular relatively heavy parts are attached to hanging metal plate 220 inside housing 210.

Referring again to FIG. 5. Ground terminal 203 is attached to metal plate ground 130. This is done so that ground terminal 203 will ground metal plate ground 130. That is, a loop is formed using hanging metal plate 220, terminal panel 150, and metal plate ground 130. That is, the annular conductor is grounded. In other words, hanging metal plate 220 is grounded via metal plate ground 130. Incidentally, by being grounded metal plate ground 130 constitutes a ground inside housing 210.

(Effects)

Next, the operation and effect of the first example embodiment will be described. In the electrical device, an unintentional noise current may flow through the sheet metal member, causing the sheet metal member to function as an antenna and to radiate noise. Referring to FIG. 5, hanging metal plate 220 is connected to ground terminal 203 via metal plate ground 130. Thus, even when there is an input of an unintentional noise current to hanging metal plate 220, the noise current is emitted to the outside along ground terminal 203. Therefore, hanging metal plate 220 is less likely to behave as an antenna to radiate noise and the projector 10 can prevent the noise emission.

Further, as described above, hanging metal plate 220 is connected to hanging metal fitting 260 electrically with low resistance (see FIGS. 3 and 6). Furthermore, when projector 10 is installed, hanging metal fitting 260 serves as a ground plane. Accordingly, hanging metal plate 220 is not only electrically connected to ground terminal 203, but also is electrically connected to hanging metal fitting 260 that is a ground plane. That is, projector 10 can emit noise current not only from ground terminal 203 described above, but also from hanging metal fitting 260 to the outside. Therefore, hanging metal plate 220 is less likely to behave as an antenna to radiate noise and projector 10 can prevent the noise emission.

Figure 8:
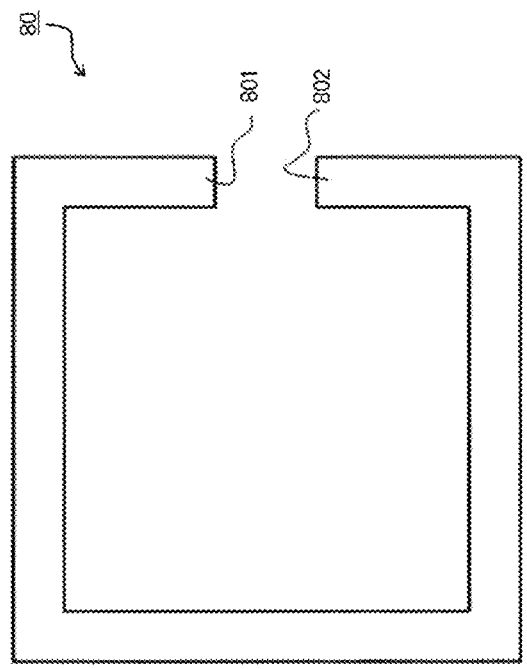
FIG. 8 is a front view showing a sheet metal member in which a loop is not formed, which is simplified for explanation.
Figure 9:
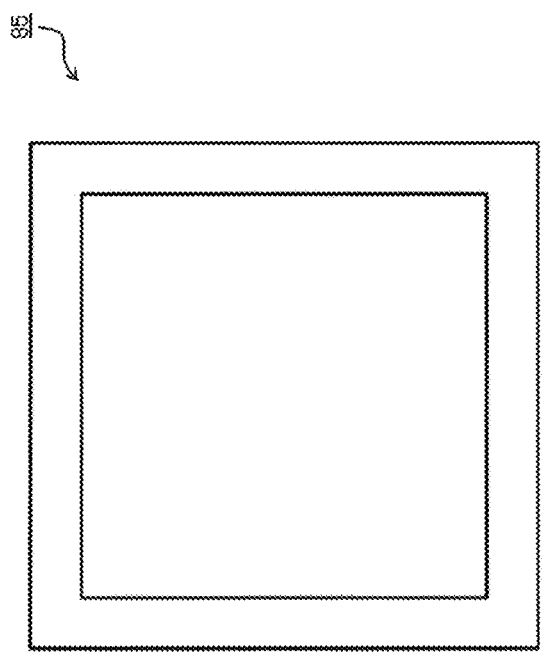
FIG. 9 is a front view showing a sheet metal member in which a loop is formed, which is simplified for explanation.

Furthermore, in projector 10, as shown in FIG. 5, a loop including hanging metal plate 220 is formed. Thus, the function as an antenna to radiate noise of hanging metal plate 220 is prevented. The reason will be described below. First, the reason why it becomes difficult for the sheet metal member to emit noise due to the formation of the loop will be described. FIG. 8 is a front view showing a sheet metal member in which a loop is not formed, which is simplified for explanation. FIG. 9 is a front view showing a sheet metal member in which a loop is formed, which is simplified similar to FIG. 8. Referring to FIG. 8, sheet metal member 80 has an end portion 801 and an end portion 802. Since nothing is connected to end portions 801 and 802, the respective end portions 801 and 802 are open ends through which electricity does not flow. Therefore, since sheet metal member 80 has the open ends at the tip of the conductor, a dipole antenna having end portion 801 and end portion 802 as the open ends is configured. Then, when the dipole antenna is configured, the member of the conductor tends to radiate noise. However, as shown in FIG. 9, sheet metal member 85 having a loop shape does not have the same open end as end 801,802 of sheet metal member 80 shown in FIG. 8. Accordingly, sheet metal member 85 does not constitute a dipole antenna having an open end (end portions 801,802) such as sheet metal member 80 shown in FIG. 8. Thus, when the noise current flows, sheet metal member 85 having a loop shape is less likely to radiate noise than sheet metal member 80.

Figure 10:
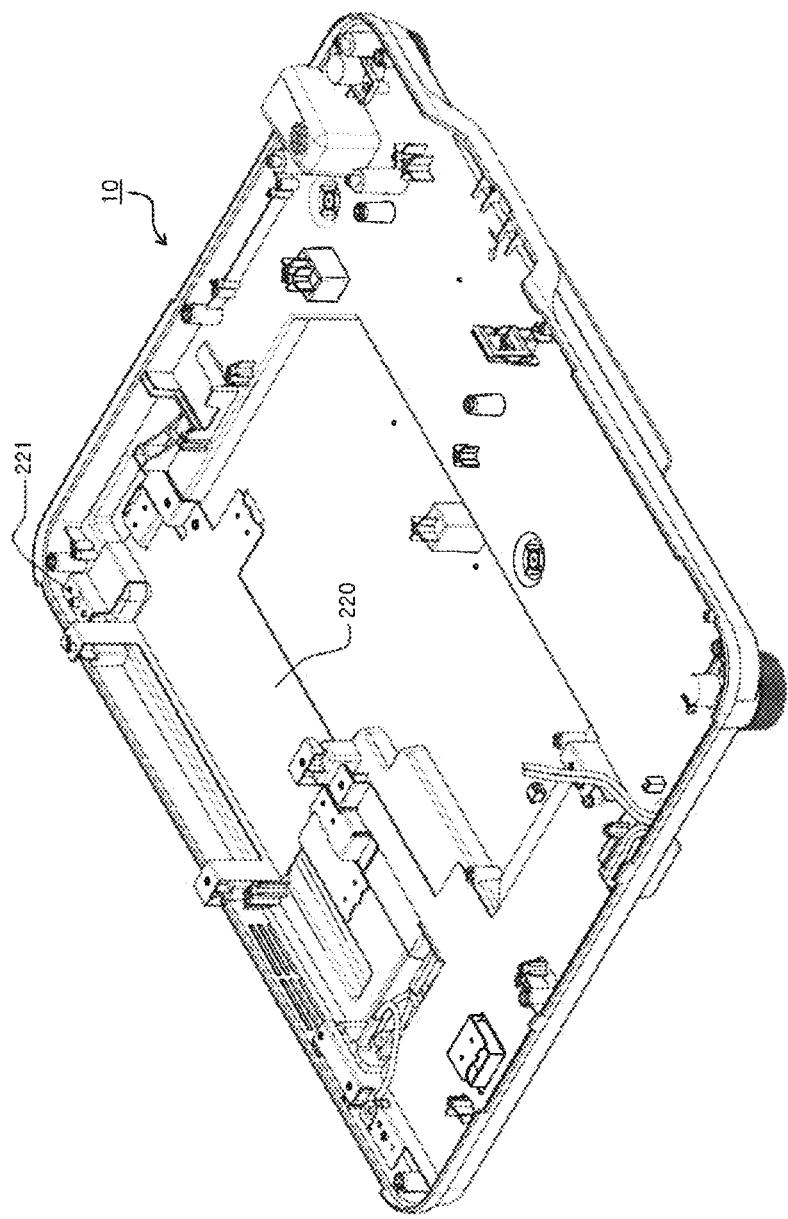
FIG. 10 is a perspective view showing a configuration in which the terminal panel is removed from FIG. 5.

In view of the above, next, in projector 10 the reason why the function of the hanging metal plate 220 as an antenna for radiating noise is prevented will be described. FIG. 10 is a perspective view showing a configuration in which terminal panel 150 is removed from FIG. 5 Referring to FIG. 10, nothing is connected to end portion 221 of hanging metal plate 220. That is, the end portion 221 is an open end in which current does not flow. When terminal panel 150 is not connected to hanging metal plate 220 in the state shown in FIG. 10, hanging metal plate 220 constitutes a dipole antenna having an open end at the tip of the conductor similarly to schematic sheet metal member 80 shown in FIG. 8. However, in the present embodiment, as shown in FIG. 5, end portion 151 of terminal panel 150 is connected to end portion 221 of hanging metal plate 220. Thus, the open end is not formed at the position of end portion 221. Moreover, since end portion 131 of metal plate ground 130 is connected to the other end portion 152 of terminal panel 150 which is connected to hanging metal plate 220, the other end portion 152 does not become an open end. Furthermore, the other end portion 132 of metal plate ground 130 is connected to the other end portion 222 of hanging metal plate 220. As a result, hanging metal plate 220 and terminal panel 150 and metal plate ground 130 form a loop shape integrally (see FIG. 5). By looping, neither the end portion 221,222 of the hanging metal plate 220, nor the end portion 151,152 of the terminal panel 150, nor the end portion 131,132 of metal plate ground 130 is an open end where current does not flow. Therefore, by forming the loop shape, the above-mentioned dipole antenna having each end portions 221,222,151,152, 131,132 as open ends are not configured, it is possible to reduce the noise radiated from the hanging metal plate 220. That is, the projector 10 can prevent noise emission.

Next, the reason why the drop of the projector 10 is prevented will be described. In all mounting portions, the hanging metal fitting is not fixed to the sheet metal member inside the resin housing, but the hanging metal fitting is fixed to the insert nut embedded in the mounting portions. With this configuration, there is a risk that the mounting portions may be damaged and the projector may drop due to the aging of the resin in the mounting portions or the occurrence of chemical cracks. However, in the projector 10, as shown in FIG. 6, hanging metal fitting 260 is fixed to hanging metal plate 220 inside resin housing 210. Therefore, even when the resin housing including mounting portion 251,252,253,254 is damaged, the hanging metal plate 220 can maintain a state of being held on the ceiling or wall surface by using hanging metal fitting 260. If various parts (main components) not shown are mounted on hanging metal plate 220, even if the resin housing is damaged, these parts are held in a state of being hung from the ceiling or from the wall surface. With such a configuration, it is possible to prevent projector 10 from dropping.

Further, in projector 10, hanging metal fitting 260, at two locations of mounting portion 253 and mounting portion 254, is fixed to hanging metal plate 220 (see FIG. 4). Therefore, projector 10 is less likely to fall than when hanging metal fitting 260 is fixed to hanging metal plate 220 at one location.

Further, in the position of mounting portion 253 and mounting portion 254, although hanging metal fitting 260 is fixed to hanging metal plate 220, in the position of mounting portion 251 and mounting portion 252, hanging metal fitting 260 is not fixed to hanging metal plate 220. Thus, projector 10 does not need to include large hanging metal plate 220 (see FIG. 7). If it is assumed that hanging metal fitting 260 is fixed to hanging metal plate 220 at the positions of mounting portion 251 and mounting portion 252, it is necessary to dispose the caulking nut at the positions of mounting portion 251 and mounting portion 252. Therefore, since hanging metal plate 220 has a caulking nut, it is necessary to extend to the position of mounting portion 251 and mounting portion 252. Therefore, it is necessary to form the loop shape by terminal panel 150 arranged on rear surface 42 side and hanging metal plate 220 that has the caulking nuts at the positions of mounting portions 251 and 252 on front surface 43 side. In this case, the loop shape becomes large, hanging metal plate 220 and terminal panel 150 or the like also becomes large. However, in projector 10, in the position of mounting portion 251 and mounting portion 252, hanging metal fitting 260 is not fixed to hanging metal plate 220. Thus, it is possible to reduce the size of hanging metal plate 220. When the conductive sheet metal member such as hanging metal plate 220 and terminal panel 150 is miniaturized, it is possible to reduce the noise radiated from these sheet metal members. Further it is possible to reduce the amount of material used in the sheet metal member. That is, projector 10 includes caulking nuts 231 and 232 fixed to hanging metal plate 220 on mounting portion 253 and mounting portion 254 that are closest to terminal panel 150 among mounting portions 251, 252, 253, and 254. As a result, it is possible to reduce the amount of material while preventing a drop and preventing the noise emission.

The mounting portion 254 is located on a straight line passing over mounting portion 253 of bottom surface 41, and on a straight line substantially parallel to the side of the straight line connecting rear surface 42 and bottom surface 41 (See FIG. 3). Thus, the distance between mounting portion 253 and mounting portion 254 from rear surface 42 becomes substantially equal. Since mounting portion 253 and mounting portion 254 have substantially the same distance from rear surface 42, even when fixing hanging metal fitting 260 at two locations of mounting portion 253 and mounting portion 254 to hanging metal plate 220, hanging metal plate 220 does not need to be extended to the side of front surface 43. Even without hanging metal plate 220 large, hanging metal plate 220 can fix hanging metal fitting 260 at two locations.

(Modified Example)

The configuration of the projector described in the above embodiment is only an example, and it is needless to say that the configuration may be changed within a range not departing from the gist of the present invention.

For example, in the configuration described above, for fixing hanging metal fitting 260, hanging metal plate 220 has a caulking nut 231, 232, but it may have a burling or welding nut in place of the caulking nut.

Further, in the above-described configuration, in order to form the loop shape, three types of sheet metal materials, that is, hanging metal plate 220, terminal panel 150, and metal plate ground 130 are used, but terminal panel 150 and metal plate ground 130 are an example of a metal member.

The loop shape may be formed by connecting another metal member to hanging metal plate 220.

Second Example Embodiment (Structure)

Figure 11:
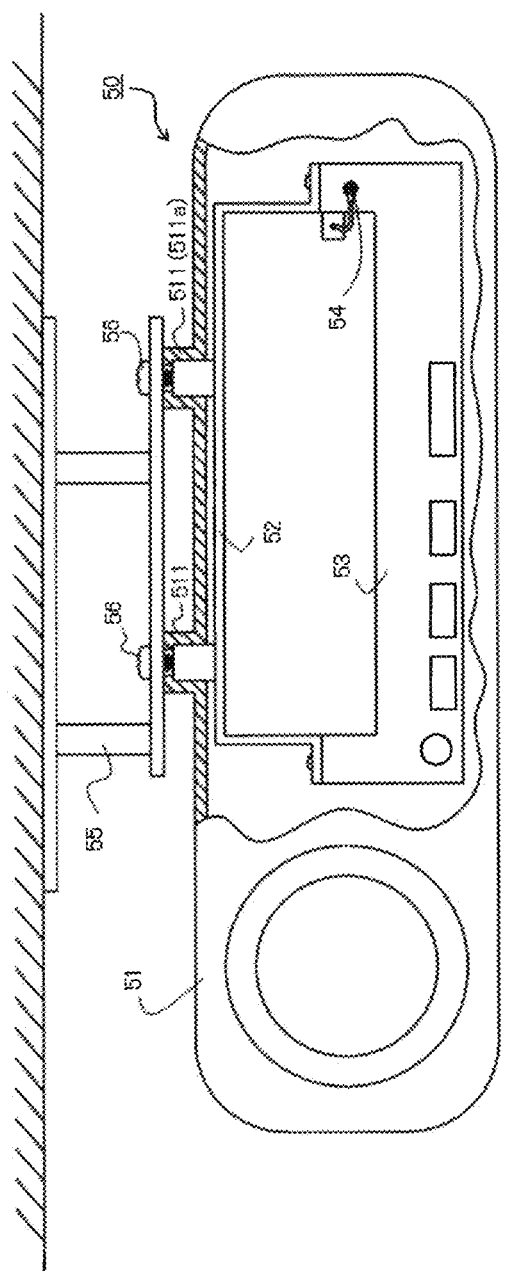
FIG. 11 is a front view showing a configuration of a projector according to a second example embodiment of the present invention.

FIG. 11 is a front view showing a configuration of a projector according to a second example embodiment of the present invention. Referring to FIG. 11, the projector 50 includes housing 51, hanging metal plate 52, metal member 53, grounding member 54, hanging metal fitting 55 and fixing member 56.

Housing 51 has a plurality of mounting portions 511. The housing 51 is made of resin.

Hanging metal plate 52 is disposed inside housing 51.

Metal member 53 is disposed inside housing 51 to form a loop shape by connecting hanging metal plate 52.

Grounding member 54 is connected to the loop shape, to ground hanging metal plate 52.

Hanging metal fitting 55 fixes housing 51 to the wall surface or ceiling.

Fixing member 56 fixes the hanging bracket 55 from the outside of the housing 51 to a plurality of mounting portions 511.

Further, hanging metal plate 52 is fixed to hanging metal fitting 55 through fixing member 56 in at least one mounting portion 511.

(Effects)

Next, the operation and effect of the second example embodiment will be described.

In projector 50, hanging metal fitting 55 is fixed to metal hanging metal plate 52 inside resin housing 51. Therefore, even if the resin of mounting portion 511 is damaged, hanging metal fitting 55 supports projector 50 using hanging metal fitting plate 52. That is, it is possible to prevent projector 50 from dropping.

Further, metal member 53 forms a loop shape by connecting hanging metal plate 52. The loop shape is also grounded using grounding member 54. Therefore, the end portion of hanging metal plate 52 is prevented from forming an open end to form a dipole antenna. Because the dipole antenna is not configured, projector 50 can reduce noise radiated from hanging metal plate 52. That is, the projector 50 can prevent the emission of noise.

EXPLANATION OF REFERENCE NUMBERS

10 Projector
130 Metal Plate Ground
131 End portion
132 End portion
150 Terminal panel
151 End portion
152 End portion
170 Terminal port
180 Projection Lens
190 Fixing member
200 Grounding member
201 Power supply inlet
203 Ground terminal
210 Housing
211 Hole
212 Counterbore
220 Hanging metal plate
221 End portion
222 End portion
231 Caulking nut 231a female screw portion
232 Caulking nut
241 One end
242 Other end
251 Mounting portion
252 Mounting portion
253 Mounting portion
254 Mounting portion
260 Metal fitting
270 Power supply
41 Bottom surface
42 Rear surface
43 Front surface
50 Projector
51 Housing
511 Mounting portions
52 Hanging metal plate
53 Metal member
54 Grounding member
55 Hanging metal fitting
56 Fixing member

What is claimed is:

1. A projector comprising:
a resin housing having a plurality of mounting portions;
a hanging metal plate that is disposed inside the housing;
at least one metal member that is disposed inside the housing and forms a loop shape by connecting to the hanging metal plate;
a grounding member that is connected to the loop shape and grounds the hanging metal plate;
a hanging metal fitting that fixes the housing to a wall surface or ceiling; and
a fixing member that fixes the hanging metal fitting from the outside of the housing to the plurality of mounting portions; wherein
the hanging metal plate is fixed to the hanging metal fitting through the fixing member in some of the mounting portions, and
other mounting portions are not covered with the hanging metal plate.

2. The projector according to claim 1,
wherein the grounding member has a power supply inlet;
the housing has a substantially rectangular structure, wherein the power supply inlet is exposed on a first surface, and the plurality of mounting portions are disposed on a second surface adjacent to the first surface;
the mounting portions are located at a position closest to the first surface on the second surface among the plurality of mounting portions such that the fixing member fixes the hanging metal fitting to the hanging metal plate.

3. The projector according to claim 2,
wherein the fixing member also penetrates the housing and fixes the hanging metal fitting to the hanging metal plate at the mounting portions that is located on the straight line that passes over the mounting portions at a position closest to the first surface and is approximately parallel to the straight side connecting the first surface and second surface.

4. The projector according to claim 1,
wherein the fixing member conducts the hanging metal plate and the hanging metal fitting, and the hanging metal fitting constitutes a ground plane by contacting the wall surface or ceiling.

5. The projector according to claim 1,
wherein the metal member includes a terminal panel forming a terminal port on the first surface of the housing, and a metal plate ground serving as a ground inside the housing,
wherein the hanging metal plate is connected to the terminal panel, the terminal panel being connected to the metal plate ground, the metal plate ground being connected to the hanging metal plate, and
wherein the hanging metal plate, the terminal panel, and the metal plate ground form the loop shape.

6. A method of holding a projector comprising:
the projector that is configured to a resin housing having a plurality of mounting portions; a hanging metal plate that is disposed inside the housing; at least one metal member that is disposed inside the housing and that forms a loop shape by connecting to the hanging metal plate; a grounding member that is connected to the loop shape and grounds the hanging metal plate; a hanging metal fitting;
the method comprising:
fixing the hanging metal fitting to the plurality of mounting portions;
fixing the hanging metal fitting to the hanging metal plate using a fixing member in some of the mounting portions; and
fixing the housing to a wall surface or ceiling such that other mounting portions are not covered with the hanging metal plate.

7. The projector according to claim 1, wherein the hanging metal plate covers the some mounting portions in which the hanging metal plate is fixed.

8. The method of holding a projector according to claim 6, wherein, the hanging metal plate covers the some mounting portions in which the hanging metal plate is fixed.

9. A projector comprising:
a housing having a plurality of mounting portions;
a hanging metal plate that is disposed inside the housing;
at least one metal member that is disposed inside the housing and forms a loop shape by connecting to the hanging metal plate;
a grounding member that is connected to the loop shape and grounds the hanging metal plate;
a hanging metal fitting that fixes the housing to a wall surface or ceiling; and
a fixing member that fixes the hanging metal fitting from the outside of the housing to the plurality of mounting portions; wherein
the hanging metal plate is fixed to the hanging metal fitting through the fixing member in some mounting portions of the plurality of mounting portions, and
mounting portions of the plurality of mounting portions, other than the some mounting portions, are not covered with the hanging metal plate.

10. The projector according to claim 9, wherein the hanging metal plate covers the some mounting portions in which the hanging metal plate is fixed.

* * * * *